(12) United States Patent  (10) Patent No.:  US 9,002,348 B2
Sharma et al.  (45) Date of Patent:  Apr. 7, 2015

(54) UTILIZING DEVICES NEARBY

(71) Applicant: Aeris Communications, Inc., Santa Clara, CA (US)

(72) Inventors: Narendra Kumar Sharma, Sunnyvale, CA (US); Yixiang Chen, Palo Alto, CA (US)

(73) Assignee: Aeris Communications, Inc., Santa Clara, CA (US)

( * ) Notice: Subject to any disclaimer, the term of this patent is extended or adjusted under 35 U.S.C. 154(b) by 166 days.

(21) Appl. No.: 13/682,195

(22) Filed: Nov. 20, 2012

(65) Prior Publication Data

US 2014/0141767 A1 May 22, 2014

(51) Int. Cl.
*H04W 24/00* (2009.01)
*H04W 24/04* (2009.01)
*H04W 64/00* (2009.01)

(52) U.S. Cl.
CPC ............ *H04W 24/04* (2013.01); *H04W 64/006* (2013.01)

(58) Field of Classification Search
CPC . H04L 43/0811; H04L 41/0677; H04L 43/50; H04L 67/104; H04W 24/00; H04W 8/005
USPC ........................................................ 455/423
See application file for complete search history.

(56) References Cited

U.S. PATENT DOCUMENTS

| | | | |
|---|---|---|---|
| 6,697,649 B1 * | 2/2004 | Bennett et al. ................. | 455/574 |
| 8,150,373 B1 * | 4/2012 | Upadhyay et al. ............. | 455/411 |
| 8,213,319 B2 * | 7/2012 | Spott et al. ..................... | 370/242 |
| 8,738,000 B2 * | 5/2014 | Rimhagen et al. ............. | 455/437 |
| 2004/0203435 A1 * | 10/2004 | Karlquist et al. .......... | 455/67.11 |
| 2005/0207410 A1 * | 9/2005 | Adhikari et al. ............... | 370/389 |
| 2006/0002409 A1 * | 1/2006 | Menon et al. .................. | 370/409 |
| 2006/0022048 A1 | 2/2006 | Johnson | |
| 2006/0211416 A1 * | 9/2006 | Snyder et al. ................. | 455/423 |
| 2007/0242642 A1 * | 10/2007 | Bronez ......................... | 370/338 |
| 2009/0113052 A1 | 4/2009 | Doshi et al. | |
| 2009/0201896 A1 * | 8/2009 | Davis et al. ................... | 370/338 |
| 2010/0214954 A1 * | 8/2010 | Bronez ......................... | 370/254 |
| 2010/0303089 A1 * | 12/2010 | Gerdes et al. ................. | 370/401 |
| 2010/0313064 A1 * | 12/2010 | Boctor et al. .................. | 714/4 |
| 2011/0113147 A1 * | 5/2011 | Poluri et al. .................. | 709/229 |
| 2011/0246897 A1 * | 10/2011 | Lee et al. ...................... | 715/735 |
| 2012/0002539 A1 | 1/2012 | Khan et al. | |
| 2013/0143599 A1 * | 6/2013 | Li et al. ....................... | 455/456.2 |
| 2013/0295854 A1 * | 11/2013 | Olson et al. ................. | 455/67.11 |
| 2013/0303156 A1 * | 11/2013 | Astrom et al. ................ | 455/423 |
| 2014/0082159 A1 * | 3/2014 | Wu et al. ...................... | 709/220 |
| 2014/0171119 A1 * | 6/2014 | Fraccaroli .................. | 455/456.3 |

OTHER PUBLICATIONS

The International Search Report and the Written Opinion of the International Searching Authority for International Application No. PCT/US2013/070581, mailed May 12, 2014.

* cited by examiner

*Primary Examiner* — Nathan Mitchell
(74) *Attorney, Agent, or Firm* — Sawyer Law Group, P.C.

(57) ABSTRACT

The present invention relates generally to network communications, and more particularly to detecting devices having communications issues on a network. The present invention provides for determining a communications performance status in relation to a device on a communications network experiencing a communications issue by identifying the device, locating reference devices in relation to the identified device, and determining where a performance deficiency may exist in relation to the identified device and the communications network.

22 Claims, 4 Drawing Sheets

100

300

400

UTILIZING DEVICES NEARBY

FIELD OF THE INVENTION

The present invention relates generally to network communications, and more particularly to communications of devices across networks.

BACKGROUND OF THE INVENTION

Machine to machine (M2M) network communications involves technologies to communicate with other devices often of similar abilities, different from traditional cellular communication networks for instance. In basic M2M environments, a device having limited logic (such as a sensor, meter, etc.) is resident at a location to typically captured measurable event data (such as temperature, pressure, quantity, etc.). The device is typically connected through a communications network to a remote computer or server having an application layer of specific software. The data received from the connected device is converted to relevant information associated with the measured event data through the application and may often thereafter undergo analysis or further similar assessment. In many cases a connected device, when activated, may trigger and communicate the events it is intended for so that those communicated events will then be acted upon by other machines, applications, and/or users on the network.

M2M environments often involve systems of networks, wired and wireless, that are to be connected to the internet and include personal appliances and similar devices. In M2M networks, typically devices may stationary or mobile and be connected via wired or wireless access protocols, often through WiFi network protocols or a 3GPP Mobile network protocol. These devices may also have seasonal and/or elastic connectivity needs (e.g., agricultural business needs, store and forward capability). M2M communication infrastructure remains most suited to the communication needs and patterns of devices having similar abilities, characteristically, for communicating with other systems and device on the same network.

FIG. 1 depicts a basic M2M communication network 100 having typical sensor-type devices 120, 130 and 140. In FIG. 1, the M2M network 100 has a central communication gateway 110 in which communications from devices 120, 130 and 140 are linked with a service provider network 150. The linkage may be wired or wireless, and is depicted as the security camera 120 and the water alarm sensor 130 are in wireless communication with the gateway 110. Similarly, the traffic camera sensor 140 is in wired communication with the gateway, though one will appreciate that there are many variations to the type and protocol of communication for FIG. 1. As one can appreciate, there may be many variations for a M2M communication network and devices thereon.

From FIG. 1, data sensed and obtained by the devices is transmitted across the M2M network to the service provider network 150 where the data may be shared as raw data or converted to information, often though software applications. Notification equipment 160 wirelessly receives the data from the service provider network 150 and acts in accordance with the received data for the specific event. For instance where the notification equipment is an alert system to send a text to a building owner in the event of a water leak, and the water sensor has sent data indicating a water leak, the notification equipment will then trigger an event to notify the building owner. Similarly, from FIG. 1, where the user 170 receives a suite of rolling historical data as to traffic camera operation cycles, the user may then act accordingly based on the received cumulative information.

Complexities can arise in M2M networks as in most any communications network, however, of particular concern is where connected devices are experiencing connectivity issues.

For instance, a particular device on a network, be it M2M or another, may experience connectivity issues from time to time, however it is difficult to determine whether the cause of the connectivity issue is associated with the device or the network. Unfortunately, since information about the devices, the device locations, and often the devices' connectivity statuses are not readily known or determinable from traditional network communications, difficulties arise in determining where the connectivity issue actually lies. It is therefore desirable to provide for the ability to accurately determine where connectivity issues may exist in relation to affected devices.

As used herein the terms device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

As used herein the term M2M communication is understood to include methods of utilizing various connected computing devices, servers, clusters of servers, wired and/or wirelessly, which provide a networked infrastructure to deliver computing, processing and storage capacity as services where a user typically accesses applications through a connected means such as but not limited to a web browser, terminal, mobile application (i.e., app) or similar while the primary software and data are stored on servers or locations apart from the devices.

SUMMARY OF THE INVENTION

The present invention fulfills these needs and has been developed in response to the present state of the art, and in particular, in response to the problems and needs in the art that have not yet been fully solved by currently available technologies.

One embodiment of the present invention includes a method for determining a communications performance status in relation to a device on a communications network, comprising the steps of: identifying a device on the communications network to evaluate; identifying a location associated with the identified device; identifying one or more reference devices on the communications network; and generating a performance event identifier identifying the communications performance status.

Another embodiment of the present invention includes an apparatus for determining a communications performance status of a target device on a communications network. The present invention includes a portal capable of communications with a location web service, and a location index being in communication with the target device and one or more other devices having preferred processing characteristics in relation to the target device. Additionally, processing logic is provided to generate a mashup of location information of the target device and the one or more other devices in relation to data from the location index. Further logic is provided to generate a display of the one or more other devices in relation to the target device, and a performance event identifier identifying the communications performance status is generated by the present invention.

A further embodiment of the present invention includes a computer program product stored on a computer usable medium, comprising: computer readable program means for causing a computer to control an execution of an application to perform a method for determining a communications performance status in relation to a device on a communications network, comprising the steps of: selecting a target device on the communications network to evaluate; determining a location associated with the identified device; identifying one or more reference devices on the communications network; and, generating a performance event identifier identifying the communications performance status.

DETAILED DESCRIPTION OF PREFERRED EMBODIMENTS

The present invention relates generally to network communications, and more particularly to determining whether a device on the communications network is experiencing communication issues or if the communications network is experiencing communication issues associated with the device.

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention traverses that associated with traditional approaches which have limitations in determining when a device on a network is having connectivity issues, and more particularly to that which has further challenges in determining whether the connectivity issues are associated with the device or that part of the communications network associated with an affected device. The present invention, in one or more embodiments, determines whether there is an affected device, whether there are reference devices in proximity to the affected device, based upon characteristic information, and in response to such information generates a performance event identifier identifying the communications performance status so that a determination may be made as to whether the suspect device has communication issues or whether the network portion associated with the suspect device has communication issues.

Figure 1:
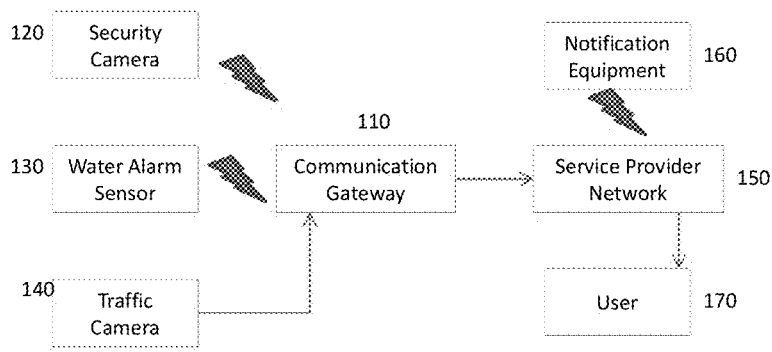
FIG. 1 depicts a basic M2M communication network having typical sensor-type devices.
Figure 2:
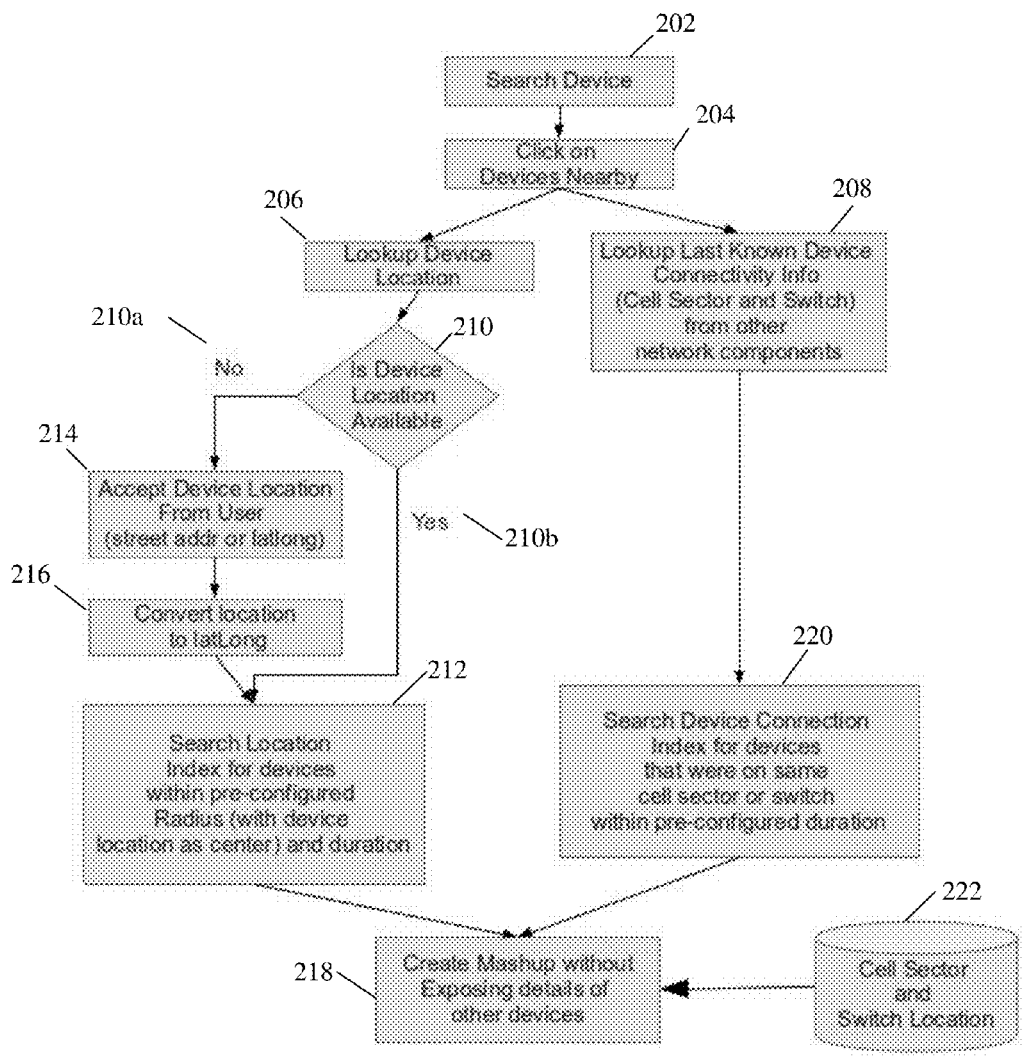
FIG. 2 depicts a method of the present invention for identifying a communications performance event which may be indicative of whether a specific device on the communications network has failed or whether a communication on the network has failed in associated with the specific device.

FIG. 2 depicts a method of the present invention 200 for identifying a communications performance event (i.e., a communications issue) which may be indicative of whether a specific device on the communications network has failed (or become inactive) or whether a communication on the network has failed in associated with the specific device. A communications issue may include a failure or deficiency in communication, a failed communications event, an interruption in transmission or receipt, or another atypical event that does not reflect a standard communication. The performance status of the specific device or the communications network may be determined in relation to the communications issue, using the present invention. Similarly, the communications health, or health status, may also be determined under the present invention.

In determining whether a specific device on a network may be affected by a communications performance issue, other terms such as "suspect," "affected," "target," or "potential," may be used to describe such a device whereas other devices on the network that are operational and distinctive from the suspect device may be referred to as "other," "reference," or "operational" for instance. In operation, the present invention may utilize a method, software program, graphical user interface, application-oriented enablement, firmware and/or other means of enabling the method so as to operate as described throughout.

From FIG. 2, the present invention is operative to provide for searching other devices within a predetermined proximity or relation to a target device to ascertain the health of the target device and/or communications network portion associated with the target device.

At 202, the present invention is enabled for operation, preferably by an application, software instantiation or user interface, where a target device is first identified to be located. Preferably at 202, a set of preferred processing characteristics are set forth which are used to identify other devices in relation to the target device, such as by location distances (i.e., ranges), timing periods (i.e., duration), and communication sector portions (e.g., cell sector, switch location, etc.), where the present invention is not so limited to only that which is set forth above.

At 204, a sub-process of identifying other devices that are within a predetermined location of the target device is started. The sub-process traverses two paths, one at 206 which involves identifying the location of the target device and the other path at 208 which involves determining the last known connectivity information of the target device.

At 206, the device location of the target device is identified. In a preferred embodiment, the target device includes a global positioning system (GPS) module which includes information associated with the target device's physical location which may be located in a database, a server, other look-up type of data repository, or where the physical location may also be in a form that can be transmitted to the present invention from the target device. At 210, a determination is made as to whether the location data of the target device is available, where if it is, the process continues at 210b and passes the location data to step 212, but if the location data is not available, the process continues at 210a.

If target device location is not available, from 210a, the target device location may be input by a user of the present invention or via another input source external to the present invention. Location information of the target device may, in relation to the network, be obtained from the target device, a location database, a location reference characteristic, and data input from a source external to the communications network. In a preferred enablement, location data for the target device includes a street address or latitude/longitude information about the target device, at 214. Once the location data of the target device is obtained via 214, the obtained location data is preferably converted to latitude/longitude information, at 216. Converted location data is then passed to step 212.

At 212, a search location index is established in relation to the preferred processing characteristics of 202 in which other devices within a pre-configured radius (e.g., with device location as center), duration, or other predetermined characteristics. Preferably, these other devices which are determined to be within or have the preferred processing characteristics are absent of having failed communications events.

Returning to 204, at 208 the last known connectivity information of the target device is determined. The last known connectivity information may include cell sector information, switch location information, etc., which can be determined from other devices inclusive of other networked components. As used herein, a prior connectivity characteristic of the device may include a last known connectivity event, communication, transmission or similar. Alternatively, the last known connectivity information of the target device may in some embodiments be available from look-up tables, communication database information, other sourced input, and communication link histories, depending on the particular network and operation. Once the last known connectivity information of the target device is determined in 208, the device connection index is searched at 220 for other devices having similar preferred processing characteristics such as those that were on the same cell sector, switch location, and/or within the predetermined duration.

At 218, index results of each of the location index of 212, the device connection index of 220, and the cell sector and switch location details at 222 are combined to create an index mashup which is preferably devoid of sensitive details of other devices. In a preferred embodiment, the present invention may also be integrated with one or more network monitoring systems to indicate whether the cell sector and switch associated with the target device is experiencing communications issues.

In operation, the present invention identifies, in relation to the performance event identifier generated (such as the mashup), whether a communications issue exists with one or more of the target device, the communications network, or another source associated with communications and the network. The present invention generates the mashup preferably as a performance event identifier to provide indication, such as a communications performance status, of where a communications issue, such as a failure, has occurred such that appropriate correction to the device, network or other source may be facilitated.

Figure 3:
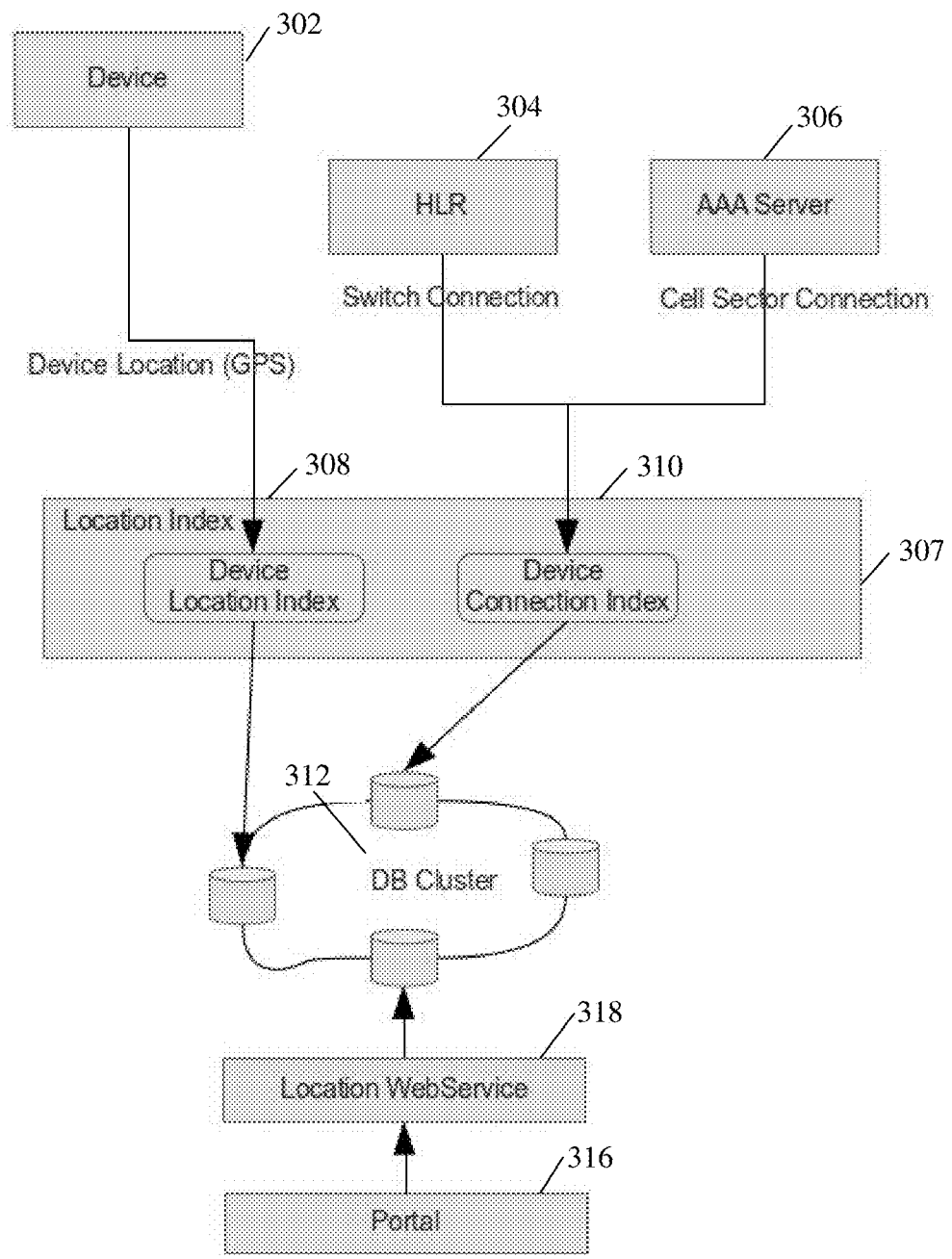
FIG. 3 sets forth an information flow for the present invention in one or more preferred embodiments.

FIG. 3 sets forth an information flow 300 for the present invention in one or more preferred embodiments. From FIG. 3, the target device is depicted at 302, where information from the target device (such as GPS location details, for instance) information is obtained and passed and to the device location index 308 and is converted for use. Other information of the target device, such as switch connection location information, is obtained from the home location register (HLR) at 304, and cell sector connection information is obtained from the server at 306. Both the switch connection information and the cell sector connection information are provided to the device connection index at 310 and are converted for use. In a preferred embodiment, the server is an Authentication, Authorization and Accounting (AAA) server.

Information associated with the target device and provided to the location index 307 may include information from the AAA Server 306 and HLR Logs 304, for instance, which is converted into device location index 308 and device connection index 310. Preferably, the location index consists of one or more of the following indexes: a device based location index; a time based location index; a device connection index; a base station identification (BSID) connection index; a publicly-switched data network (PDSN) connection Index; and, a cell sector location index. Index exemplars for the present invention are provided below. It will be appreciated by those skilled in the art that additional indexes can be created for mobile directory number (MDN) to switch (mobile switching center—MSC) a mapping information based on information from HLR within the scope of the present invention.

Continuing from FIG. 3, output from the location index 307 is provided to a database cluster 312 in a preferred embodiment, The database cluster may preferably be used for storing and processing time series data and storing indexes. A portal is provided at 316 to provide access to the present invention which utilizes, in a preferred embodiment, a location web service at 318 to provide a user of the system access to the indexes on the database cluster 312. In one or more preferred embodiments, a user interface is provided at the portal 316.

By way of example, indexes associated with the present invention as described above may include the following:

Device based location index: Preferably, this index provides the last known location of device within given duration

| Column Family: devlocbyid | |
| --- | --- |
| Row Key: <MDN> | Column Key: <time in microsecond><br>Column Value: <latitude, longitude, uncertainty, altitude, speed, time (microseconds)> |

Time based location index: Preferably, this index is of all locations available by time. This allows fetching the all known locations and devices within a given duration and filtering the ones that are near the source device.

| Column Family: devlocbytime | |
| --- | --- |
| Row Key: <time in minutes> | Column Key: <geo hash of location, MDN><br>Column Value: <latitude, longitude, uncertainty, altitude, speed, time (microseconds)> |

Device Connection Index: Preferably this index provides the last known BSID and PDSN for a given device within a given duration.

| Column Family: deviceconnection | |
| --- | --- |
| Row Key: <MDN> | Column Key: <time in microsecond><br>Column Value: <BSID, PDSN, time (microseconds)> |

BSID Connection Index: Preferably, this index provides the list of devices connected to BSID per hour. This allows fetching all devices that were connected to same BSID during given duration.

| Column Family: bsidconnection | |
| --- | --- |
| Row Key: <BSID, time in hour> | Column Key: <MDN><br>Column Value: <PDSN, time (microseconds)> |

PDSN Connection Index: Preferably this index provides the list of devices connected to PDSN per hour. This allows fetching all devices that were connected to same PDSN during given duration.

| Column Family: pdsnconnection | |
|---|---|
| Row Key: <PDSN, time in hour> | Column Key: <MDN><br>Column Value: <BSID, time (microseconds)> |

Cell Sector Location Index: Preferably this index provides location details of BSID.

| Column Family: celllocation | | | | | |
|---|---|---|---|---|---|
| Row Key: <BSID> | Column Key: "alat"<br>Column Value: <antenna latitude> | Column Key: "alon"<br>Column Value: <antenna longitude> | Column Key: "clat"<br>Column Value: <center latitude> | Column Key: "clon"<br>Column Value: <center longitude> | Column Key: "uncer"<br>Column Value: <uncertainty> |

Figure 4:
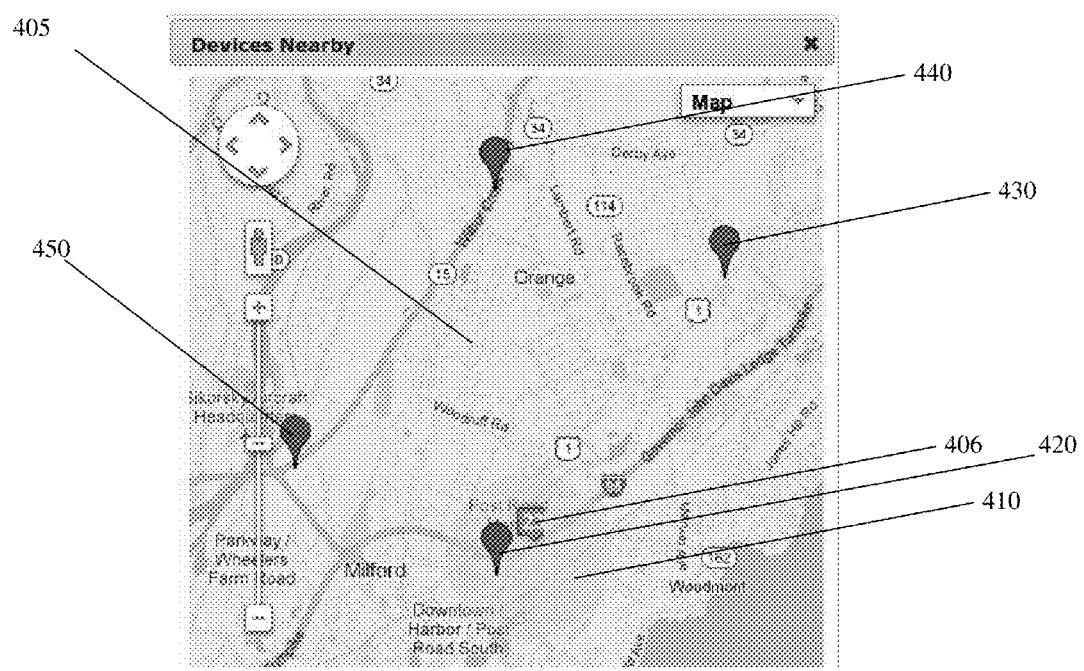
FIG. 4 depicts an exemplary screenshot of the present invention identifying other devices nearby to the target device, in one or more preferred embodiments.

FIG. 4 depicts an exemplary screenshot 400 of the present invention identifying other devices nearby to the target device, in one or more preferred embodiments. From FIG. 4, a map 405 of the area of interest is depicted. On the map 405, a circle area 410 denotes the cell sector of interest for the present scenario. A number (23) is identified at 406 which is an indication of the number of devices in the same cell sector within the given duration (using preferred processing characteristics) for the scenario of the present invention. The markers 420, 430, 440 and 450 denote other devices nearby the current device in question.

From FIG. 4, it will be appreciated that the present invention has distinctive advantages and improvements over the existing methods or devices by providing an optimized method for troubleshooting and diagnosing connectivity issues of and at a specific device level is provided. This present invention is applicable to a diversity of communications networks and has significant benefits in existing cellular environments, including indoor cells such as femtocells. In operation, by example, the present invention can be utilized to determine if a particular device is inactive due to a problem with device or if the particular femtocell is not operating properly. If a determination is made that the femtocell is not operating properly the identified device can be moved to a nearby femtocell which is operating properly to enhance operation, however the present invention is not so limited to this example.

The present invention provides for a method, apparatus and computer program to detect devices having one or more preferred processing characteristics which are near a target device that may be experiencing communications issues. The present invention provides for using information from other networked components that achieve successful connection setup to determine whether there exist other devices also connected to the network. The present invention processes this information, using a mashup approach of indexed information, to identify where a communication issue may exist on the network or with a specific device.

Additional utilization of the present invention is envisioned in one or more embodiments where the sources available for integration may be identified and associated with creating or identifying data streams to gather associated data from within the network.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims. Many other embodiments of the present invention are also envisioned.

In one or more preferred embodiments, servers and/or back-end servers may include AAA servers.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein, the term Home Location Register is generally understood to be a database that resides within a network to hold current details about a subscriber, the equipment in use, the service(s) required, the user's identification encryption code, a user's "Home" cell, and what network the subscriber was last known to be using, etc.

As used herein, the term mashup is generally understood to be a web application that combines data from more than one source into a single integrated application.

Similarly, it is envisioned by the present invention that the term communications network includes communications across a network (such as that of a M2M but not limited thereto) using one or more communication architectures, methods, and networks, including but not limited to: Code division multiple access (CDMA), Global System for Mobile Communications (GSM) ("GSM" is a trademark of the GSM Association), Universal Mobile Telecommunications System (UMTS), Long Term Evolution (LTE), 4G LTE, wireless local area network (WIFI), and one or more wired networks

What is claimed is:

1. A method for determining a communications performance status in relation to a device on a communications network, comprising the steps of:
   identifying a device on the communications network to evaluate, wherein the step of identifying a device further includes searching the communications network for one or more devices having one or more failed communications events;
   identifying a location associated with the identified device, wherein the step of identifying a location associated with the identified device further comprises determining location data to determine the location for the identified device, wherein the step of determining location data includes identifying location data from one or more of the identified device, a location database, a location reference characteristic, and data input from a source external to the communications network;
   identifying one or more reference devices on the communications network, wherein the step of identifying one or more reference devices further includes searching the communications network for one or more devices having no failed communications events;
   generating a performance event identifier identifying the communications performance status; and
   identifying the one or more reference devices, having no failed communications events, which are within a predetermined location range associated with the identified device.

2. The method of claim 1, further comprising identifying a source of a communications issue in relation to the performance event identifier generated.

3. The method of claim 1, further comprising identifying a health status of the identified device on the communications network in association with the performance event identifier generated.

4. The method of claim 1, further comprising identifying a prior connectivity characteristic of the identified device.

5. The method of claim 4, wherein the prior connectivity characteristic of the identified device includes connectivity information of the identified device occurring prior to the one or more failed communication events.

6. The method of claim 5, wherein the one or more failed communication events is a communications failure associated with either an operation of the identified device or an operation of the communications network.

7. The method of claim 6, wherein the performance event identifier generated includes information associated with one or more preferred processing characteristics including a reference device, a cell sector, and a switch location of the communications network.

8. The method of claim 7, further comprising the step of identifying, in relation to the performance event identifier generated, whether the communications issue exists with one or more of the identified device, the communications network, or another source.

9. The method of claim 8, wherein the performance event identifier generated is indicative that the identified device has failed.

10. The method of claim 8, wherein the performance event identifier generated is indicative that the communications network associated with the identified device has failed.

11. The method of claim 9, wherein the communication performance status is determined to be failed for the identified device if the performance event identifier generated is indicative that the identified device has one or more failed communications events.

12. The method of claim 10, wherein the communication performance status is determined to be failed for the communications network if the performance event identifier generated is indicative that the communications network has one or more failed communications operations associated with the identified device.

13. The method of claim 12, wherein the communications network is one or more of a cellular network, a M2M network, and a data network.

14. An apparatus for determining a communicators performance status of a target device on a communications network, comprising:
a portal capable of communications with a location web service and a server across the communications network having a location index, the location index being in communication with the target device and one or more other devices having preferred processing characteristics in relation to the target device,
processing logic to generate a mashup of location information of the target device and the one or more other devices in relation to data from the location index, and
processing logic to generate a display of the one or more other devices in relation to the target device, and a performance event identifier identifying the communications performance status;
wherein the server further includes an application module for generating the mashup and comparing the generated mashup to one or more communications performance criteria; and issuing a notification of a source of a communications issue in relation to the target device.

15. The apparatus of claim 14, wherein a target device health status is displayed via the portal.

16. The apparatus of claim 15, wherein the application module further includes logic to determine whether the target device failed or whether the communications network associated with the target device failed.

17. The apparatus of claim 16, wherein a map is displayed indicating a location of the target device and a location for each of the one or more other devices.

18. A non-transitory computer program product stored on a computer usable medium, comprising: computer readable program means for causing a computer to control an execution of an application to perform a method for determining a communications performance status in relation to a device on a communications network, comprising the steps of:
identifying a device on the communications network to evaluate, wherein the step of identifying a device further includes searching the communications network for one or more devices having one or more failed communications events;
identifying a location associated with the identified device, wherein the step of identifying a location associated with the identified device further comprises determining location data to determine the location for the identified device, wherein the step of determining location data includes identifying location data from one or more of the identified device, a location database, a location reference characteristic, and data input from a source external to the communications network;
identifying one or more reference devices on the communications network, wherein the step of identifying one or more reference devices further includes searching the communications network for one or more devices having no failed communications events;
generating a performance event identifier identifying the communications performance status; and
identifying the one or more reference devices, having no failed communications events, which are within a predetermined location range associated with the identified device.

19. The non-transitory computer program product of claim 18, wherein the step of identifying one or more reference devices further includes searching the communications network for one or more devices having one or more preferred processing characteristics.

20. The non-transitory computer program product of claim 19, further comprising the step of identifying, in relation to the performance event identifier generated, whether a communications issue exists with one or more of the identified device, the communications network, or another source, and generating a performance status in response to the performance event identifier.

21. The non-transitory computer program product of claim 20, wherein the communication performance status is determined to be either failed for the identified device, if the performance event identifier generated is indicative that the identified device has one or more failed communications events, or for the communications network, if the communications network has one or more failed communications events.

22. The non-transitory computer program product of claim 20, further comprising generating a map for displaying which is representative of location information of the identified device and the one or more reference devices.

* * * * *